Feb. 16, 1943. A. H. OELKERS 2,310,989
CAR TRUCK
Filed Aug. 2, 1940 3 Sheets-Sheet 1
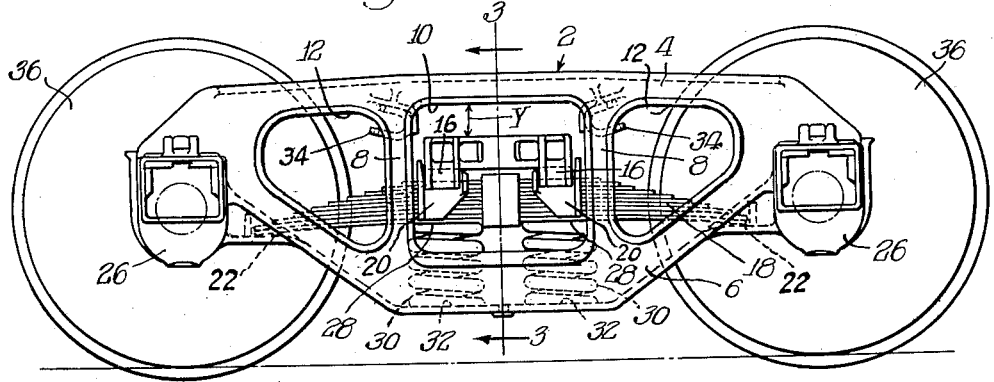
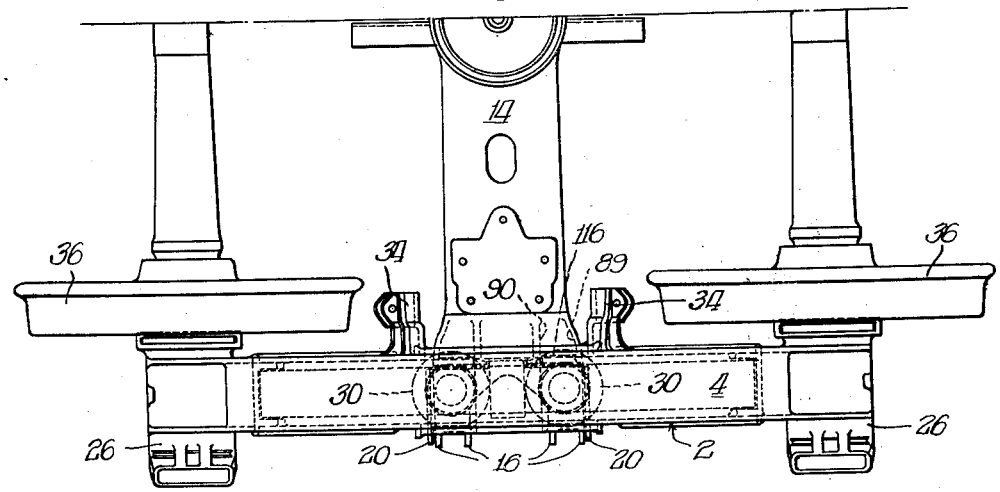
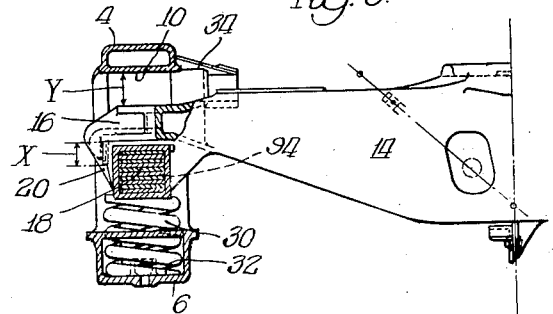
INVENTOR.
Alfred H. Oelkers.

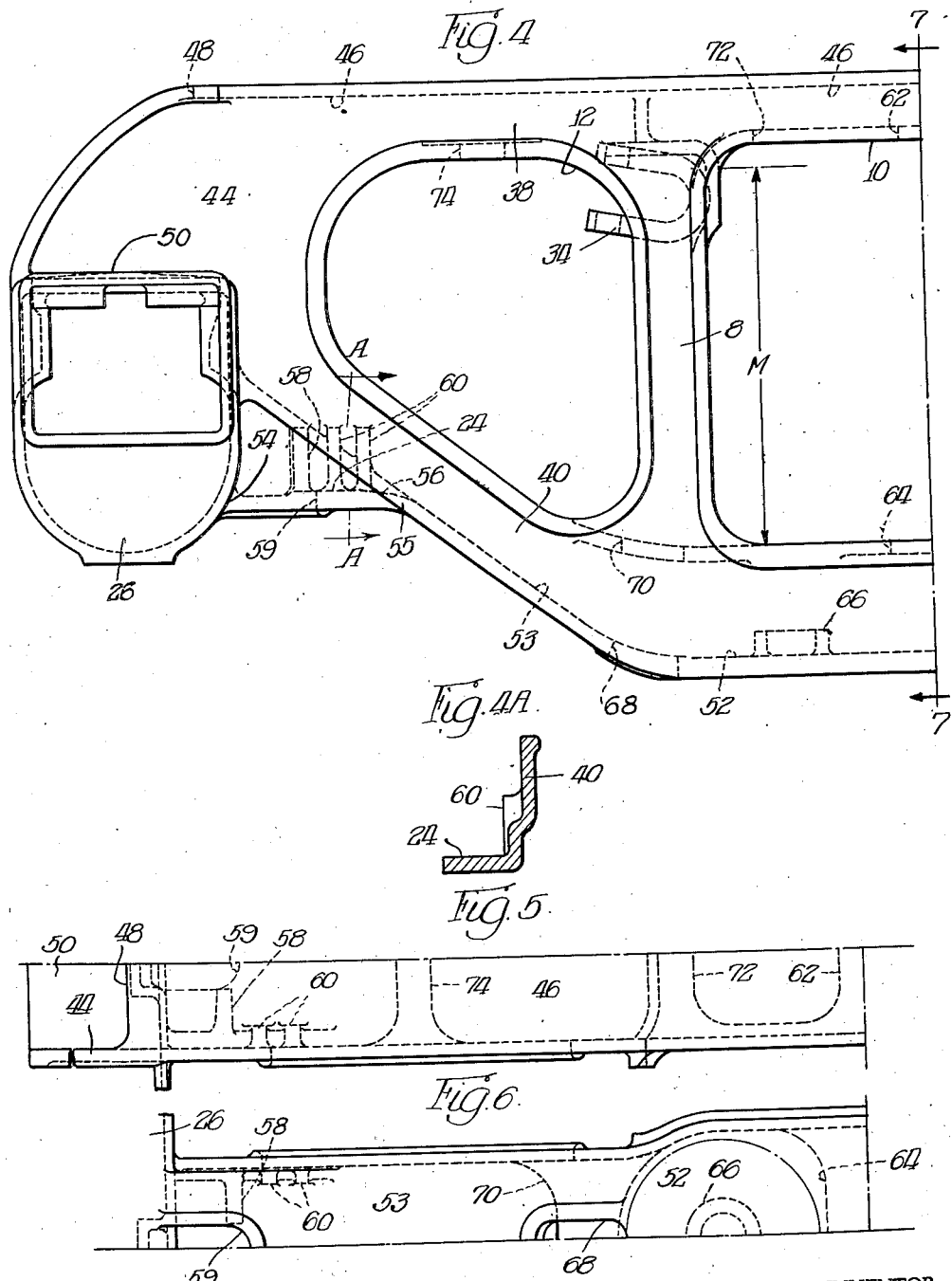

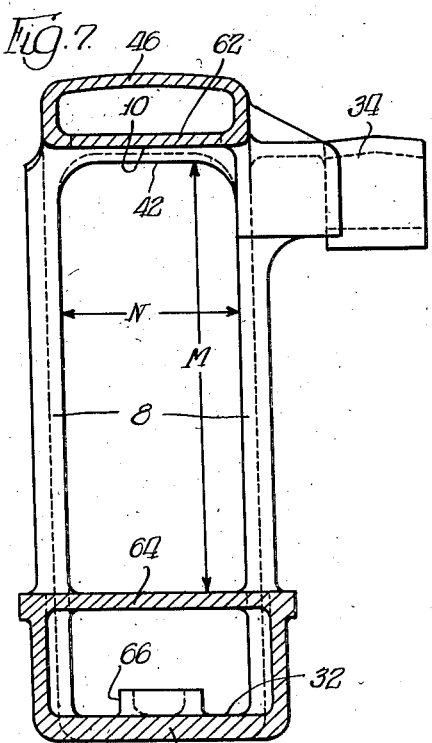
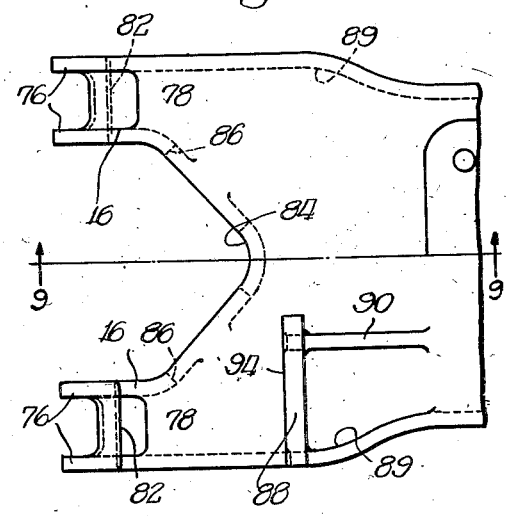
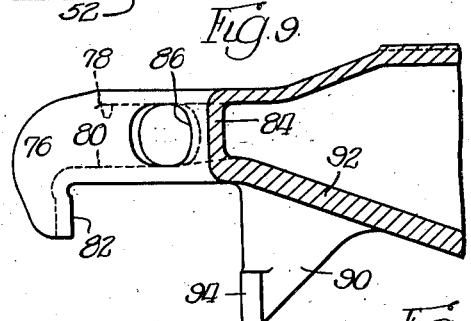
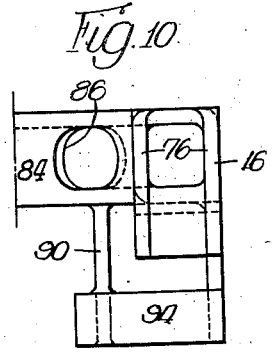
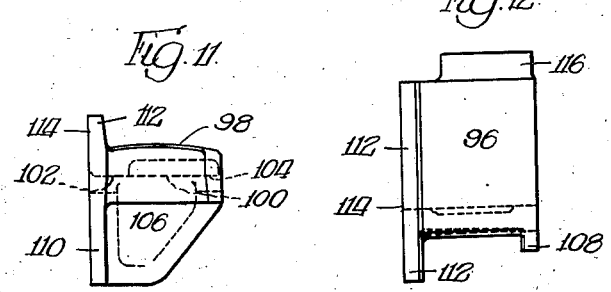
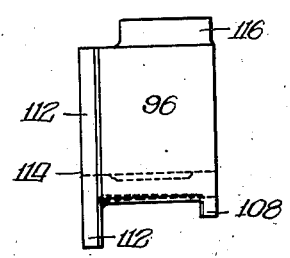
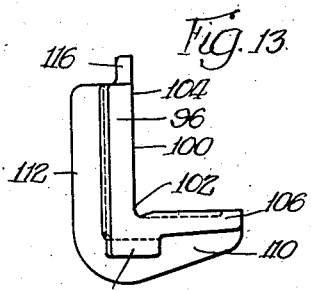

Patented Feb. 16, 1943

2,310,989

UNITED STATES PATENT OFFICE 2,310,989

CAR TRUCK

Alfred H. Oelkers, Chicago, Ill., assignor to American Steel Foundries, Chicago, Ill., a corporation of New Jersey Application August 2, 1940, Serial No. 349,448

21 Claims. (Cl. 105—197.1)

My invention relates to a four wheel freight car truck of a common type comprising spaced side frames, a connecting load carrying member, and spaced supporting wheel and axle assemblies.

An object of my invention is to devise a four wheel freight car truck of relatively simple form suitable for regular high speed service and affording a relatively great spring travel whereby the bolster or load carrying member and the car body may have relatively great movement with respect to the supporting side frames as compared with the ordinary freight car truck. In the usual freight car truck which has heretofore been used, spring travel has been limited to approximately 1⅝ inches and it will be readily apparent to those skilled in the art that the resilience afforded in trucks having such short spring travel is relatively stiff as compared with that in car trucks where a longer spring travel is permitted. My truck utilizes a novel form of side frame in order to accommodate a spring arrangement of the general form and design more particularly set forth in my Patent No. 2,097,418 issued by the United States Patent Office, October 26, 1937, and comprising a plurality of coil springs seated upon a supporting member at spaced points, and a leaf spring supported on said coil springs and at other spaced points on said supporting member with said leaf spring affording spaced points of support for the bolster or transverse member.

An object of my invention is to devise a truss type side frame suitable for accommodating such a spring group as that above mentioned and so arranged as to permit relatively great spring travel approximating twice the before mentioned 1⅝ inches previously accepted in the ordinary freight car truck.

A different object of my invention is a novel form of side frame which may be conceived of as spaced inboard and outboard trusses each having a tension member, a compression member, and spaced columns with all of said tension and compression members being joined at the opposite ends of the frame with integrally formed journal boxes, said side frame being afforded openings over the journal boxes suitable for application of a semi-elliptic spring therethrough, said spring being receivable between the spaced inboard and outboard columns of the trucks at opposite sides of the frame.

My invention further contemplates an arrangement wherein a plurality of coil springs may be seated on the tension member of the truss side frame substantially beneath the bolster opening thereof and a semi-elliptic spring seated at spaced points on said coil spring and further supported at their ends adjacent the journal boxes at the opposite ends of the frame.

Still another object of my invention is such an arrangement as that above described wherein the bolster will be afforded spaced jaw means at each end and a loading member may be associated with each of said jaws, said loading member having overlapping relationship with the associated jaw means on the bolster in such manner as to permit the disengagement of the bolster from the supporting loading members and leaf spring to facilitate quick wheel change.

My novel side frame may conveniently be conceived of as spaced inboard and outboard trusses, each truss comprising a compression member and a tension member and spaced columns defining a central bolster opening and adjacent window openings with the said inboard and outboard trusses joined by a top web continuous from end to end of the frame with an intervening space between the trusses and the columns thereof left open to accommodate the before mentioned semi-elliptic spring which may be inserted from either end of the frame above the journal box. By such arrangement I am able to conserve considerable space and to make use of a spring group having approximately double the resilient capacity of the present day conventional freight car truck built within the same standard dimensions. This greater spring capacity accommodates relatively great deflection as already described thus affording easier riding qualities for a given load capacity while at the same time maintaining the present minimum and maximum heights above the rail as well as the wheel base of the present conventional standard freight car truck.

Figure 1 is a side elevation of a four wheel freight car truck embodying my invention. Figure 2 is a top plan view thereof only one-half the truck structure being shown inasmuch as the arrangement is similar at opposite sides of the truck.

Figure 3 is a sectional view through the arrangement shown in Figures 1 and 2, the section being taken substantially in the transverse vertical center plane bisecting the truck and as indicated by the line 3—3 of Figure 1.

Figures 4 to 7 inclusive show in detail my novel form of side frame, Figure 4 being a side elevation of one end of the frame. Figure 4A is a fragmentary sectional view taken transversely through the spring seats adjacent the journal box and substantially as indicated by the line A—A of Figure 4.

Figure 5 is a half top plan view.

Figure 6 is a fragmentary bottom plan, and Figure 7 is a sectional view taken substantially in the vertical plane bisecting the side frame transversely as indicated by the line 7—7 of Figure 4.

Figure 8 is a fragmentary end view of the bolster, the upper half thereof showing a top plan and the lower half thereof the bottom plan.

Figure 9 is a sectional view therethrough taken substantially in the transverse vertical plane bisecting the bolster and as indicated by the line 9—9 of Figure 8, and Figure 10 is a half end view of the bolster taken from the left as seen in Figure 8. Figures 11, 12, and 13 show in detail my novel form of loading block, Figure 11 being a front elevation thereof, Figure 12 a top plan, and Figure 13 a side elevation.

Describing the structure in greater detail, it comprises a truss side frame 2 of novel form more particularly described hereafter, said side frame comprising a top or compression member 4, bottom or tension member 6 with spaced inboard and outboard columns 8, 8 defining with said tension and compression members a bolster opening 10 and spaced window openings 12, 12. Within the bolster opening 10 may be received the bifurcated end of the bolster generally designated 14, said bifurcated end comprising spaced jaws 16, 16 having interlocking relationship with the semi-elliptic spring 18 through the medium of spaced loading blocks 20, 20 hereinafter more particularly described. The semi-elliptic spring 18 extends between the inboard and outboard spaced columns 8, 8 for vertical movement therebetween, and its opposite ends may be seated as at 22, 22 upon the seats 24, 24 (Figure 4A) afforded at opposite ends of the frame inwardly of the integral journal boxes 26, 26. The semi-elliptic spring 18 is afforded spaced seats as at 28, 28 upon the spaced nests 30, 30, said nests being seated as at 32, 32 upon the bottom web of the tension member 6. On the inboard face of the frame adjacent the juncture of each inboard column 8 with the compression member are formed the integral brake hanger jaws 34, 34.

Spaced wheel and axle assemblies 36, 36 at opposite ends of the truck are afforded journals for connection to the aforesaid journal boxes in the usual manner.

Figures 4 to 7 inclusive show my novel side frame in detail. It may conveniently be described as spaced inboard and outboard trusses, each formed substantially in a vertical plane and comprising a compression member 38, a tension member 40, and spaced columns 8, 8 at opposite sides of the window opening 10. Between the opposite inboard and outboard columns 8, 8 at each side of said opening 10 is afforded a rectangular opening 42 (Figure 7) having the vertical dimension indicated at M and the transverse dimension indicated at N in order to accommodate insertion of the before-mentioned semi-elliptic spring, said spring being confined centrally of the frame between the spaced inboard and outboard columns 8, 8.

The vertical webs comprising the tension and compression portions 38 and 40 merge outwardly of each end window opening 12 in the end web 44, and the webs 44, 44 at the inboard and outboard sides of the frame are spaced apart a distance substantially equal to the aforementioned dimension N in order to accommodate insertion therebetween of the said semi-elliptic spring. The vertical webs 38, 40, and 44 are substantially co-planar from end to end of the frame and at the top thereof are joined by a transverse web 46 which extends horizontally from end to end of the frame and terminates as at 48 over the inner edge of the integral boxes 26. The top of the box 26 designated 50 is substantially flat, and the said boxes 26, 26 form integral ties between the vertical webs of the inboard and outboard trusses already referred to. Likewise joining the said vertical webs 38, 40, and 44 at opposite sides of the frame is the bottom web 52 extending between said vertical webs continuously from one journal box to another and merging with each box as at 54 (Figure 4) at the lower inner corner thereof. The said web 52 extends horizontally along the middle portion of the frame and diagonally upward therefrom as at 53 to merge as at 55 with another horizontal portion defining the spring seat 24. Thus on each journal box is formed a spring seat 24 extending transversely between the vertical webs 40, 40 at opposite sides of the frame, each of said seats tapering away toward the middle of the frame as at 56 in order to accommodate the flexing of the associated semi-elliptic spring. Integral stops 58, 58 are afforded against which the ends of the semi-elliptic spring may abut and guide abutments 60, 60 are formed at each side of the spring pocket.

At the top of the frame and approximately at the transverse center line thereof is afforded a tie 62 extending between the vertical webs at opposite sides of the compression member over the window opening 10 and spaced from the top web 46, and similarly at the bottom of the frame is a transverse tie 64, said tie 64 intervening between the aforesaid spring seats 32, 32 formed as already described on the bottom web 52. For the said spring groups positioning lugs 66, 66 may be formed. Drainage openings 68, 68 are afforded in the web 52 below the columns and a further transverse tie between the vertical webs at opposite sides of the frame is formed at the bases of the columns as at 70. Transverse ties are also connected between the vertical webs at the top of each column as at 72, 72 and over each window opening 12 are formed the transverse ties 74, 74. It may be noted that the means of tying together the vertical webs defining the inboard and outboard trusses at opposite sides of the frame are so located as to allow insertion of the semi-elliptic spring and to permit the unobstructed operation of said spring within the confines of the side frame between the vertical webs at opposite sides thereof. The vertical clearance M between the transverse ties at the top of the bolster opening, and the transverse ties at the bottom thereof as likewise the form of the bolster opening permits maximum deflection of the spring group in order to afford easy riding.

The detail of the bolster end is shown in Figures 8, 9, and 10. As already stated, the bolster end is of bifurcated form having at each side thereof a jaw portion 16, each jaw portion terminating in the spaced vertical webs 76, 76, the outermost of which are substantially continuations of the lateral walls 89, 89 of the bolster end, and between said webs may extend the top wall 78 and the bottom wall 80, said bottom wall being downturned as at 82 to define the outer edge of the jaw and afford abutment against the associated loading block 20. The opposite jaw portions 16, 16 have vertical diagonal webs merging as at 84 and cored away as at 86 for convenient foundry practice. The inner edge of each jaw is defined by the transverse web 88 merging with the side wall 89 of the bolster end and reinforced by the triangular gusset 90 merging with the bottom wall 92 of the bolster, said transverse web 88 affording abutment as at 94 against the inboard edge of the semi-elliptic spring 18 as best seen in the sectional view of Figure 3.

The loading block is shown in detail in Figures 11, 12 and 13, said block being of general rectangular form and comprising a top wall 96 arcuate on its upper surface as best seen at 98 (Figure 11) to afford a suitable bearing for the jaw end of the bolster. The under surface of the wall 96 is flat as seen at 100 so that when seated upon the top of the semi-elliptic spring it may have a single bearing area thereon when the semi-elliptic spring is in positive camber, and it will have bearing on said spring at spaced areas as indicated at 102 and 104 adjacent the lateral edges of said block when said spring is in reverse camber; and when the spring is deflected to the extent that it is substantially straight the entire area of the loading block will bear upon the top leaf of the spring. In such manner the loading block serves as an equalizer in distributing the load from the bolster to the semi-elliptic spring under varying conditions in service. The loading block has a vertical front wall 106 with an inner guide lug 108 and an outer vertical flange 110 which is continuous with the top horizontal flange 112, said flanges 110 and 112 being continuous around the outer edge of the block and affording relatively large area as at 114 which under certain conditions may have abutment with the adjacent side frame column 8. Between the vertical flange 110 and the vertical lug 108 may be received the outermost portion of the associated bolster jaw and the top wall 96 is extended at the rear in the horizontal lug 116 (Figure 12) which in assembly may be received between the gusset or rib 90 of the bolster end and the adjacent lateral wall 89 as best seen in the top plan view of Figure 2. By this arrangement the loading block is conveniently interlocked with the associated jaw end of the bolster. It may be noted that the outer member of the bolster jaw overlies the loading block for a vertical distance indicated at X (Figure 3) somewhat less than the vertical distance Y between the compression member of the side frame and the top wall of the bolster end so that in changing wheels it is not necessary to disturb the spring group but the bolster end may simply be raised a distance sufficient to permit its disengagement from the loading block after which the side frame with the spring assembly may be withdrawn.

In this arrangement the jaws at each end of the bolster are relatively widely spaced longitudinally of the truck and serve as squaring means for the truck by closely engaging the semi-elliptic spring as already described.

When it is desired to shim my novel truck, a flat rectangular plate may be inserted between the bolster and the loading blocks and may be prevented from shifting laterally by the jaws of the bolster and secured against longitudinal shifting by the upstanding flanges 112, 112 of the loading blocks.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a quick wheel change railway car truck, a truss side frame comprising spaced truss units formed of substantially vertical webs in spaced parallel vertical planes, each of said units comprising tension and compression members and spaced columns defining with said members aligned bolster openings, transverse webs joining said units at the top and bottom of said frame, coil prings seated on said bottom transverse web between said units, a semi-elliptic spring seated on said coil springs at spaced points and supported at its extremities in said frame, and a bolster extending into said bolster opening and having jaw portions receiving said semi-elliptic spring, said jaw portions having outboard overlapping relationship with said semi-elliptic spring a distance less than the vertical clearance between said bolster end and the top of said window opening, the columns of said inboard and outboard units being spaced to afford clearance therebetween, said clearance having depth substantially equal to the depth of said bolster openings to permit normal vertical movement of said bolster and springs in operation of said truck.

2. A side frame for a railway car truck comprising spaced truss units arranged in substantially parallel vertical planes with each unit having a tension member, a compression member, spaced columns integrally formed with said members and defining therewith transversely aligned bolster openings, said members merging adjacent their ends with integrally formed journal boxes extending between said units, transverse webs joining said units at the top and bottom of said frame, said bottom transverse web merging with said journal boxes at the extremities of said frame and said top transverse web having its ends spaced from said journal boxes to permit the insertion thereover of an associated semi-elliptic spring, and transverse ties joining the upper and lower ends respectively of the inboard and outboard columns and defining therewith openings aligned longitudinally of said frame to accommodate said semi-elliptic spring, said longitudinally aligned openings having a vertical height substantially equal to the vertical dimension of said bolster openings.

3. In a quick wheel change railway car truck, spaced side frames of truss type each comprising tension and compression members and spaced columns forming a bolster opening, said members merging adjacent the ends of the frame with integrally formed journal boxes, coil springs seated on each of said tension members beneath said bolster opening, a semi-elliptic spring housed in each frame and seated at spaced points on the associated coil springs and supported at its extremities, spaced equalizer blocks on said semi-elliptic spring in each of said openings, and a load carrying member extending between said frames with jaw ends engaging said equalizer blocks, the outboard portions of said jaw ends overlapping said semi-elliptic springs a distance less than the vertical clearance between the tops of said jaw ends and said bolster openings whereby said jaw ends may be elevated in said opening and disengaged from said semi-elliptic springs to afford wheel change while said coil and semi-elliptic springs are in normal assembled relationship.

4. In a quick wheel change railway car truck, a truss side frame comprising spaced truss units formed of substantially vertical webs in spaced parallel vertical planes, each of said units comprising tension and compression members and spaced columns defining with said members aligned bolster openings, transverse webs joining said units at the top and bottom of said frame, coil springs seated on said bottom transverse web between said units, a semi-elliptic spring seated on said coil springs at spaced points and supported at its extremities on horizontal end portions of said bottom web, and a bolster extending into said bolster openings and having jaw portions receiving said semi-elliptic spring, said jaw portions having outboard overlapping relationship with said semi-elliptic spring a distance less than the vertical clearance between said bolster end and the top of said bolster openings.

5. In a quick wheel change railway car truck, spaced truss type side frames each having tension and compression members and spaced columns defining a bolster opening, coil springs seated on said tension members beneath said bolster opening, a semi-elliptic spring seated at spaced points on said coil springs in each side frame and supported at its extremities on horizontal end portions of said tension member, and a load carrying member extending between said frames and having jaw end portions seated at spaced points on each of said semi-elliptic springs, said jaw end portions having overlapping relationship with said semi-elliptic springs a distance less than the vertical clearance between said jaw ends and the tops of said bolster openings whereby said jaw ends may be elevated in said bolster openings and disengaged from said semi-elliptic springs to permit wheel change.

6. In a truss side frame, spaced inboard and outboard truss units formed in substantially parallel vertical planes from end to end of said frame, each unit comprising a tension member, a compression member, and spaced columns defining a bolster opening, said members merging at the ends of said frame with integrally formed journal boxes extending therebetween, and longitudinal transverse webs joining said units at the top and bottom of said frame, said bottom longitudinal web having substantially horizontal end portions merging with the lower inner corners of the adjacent journal boxes to form spring seats, and said top transverse web terminating at each end at a point spaced from the adjacent journal boxes a space approximately equal to the width of said frame.

7. In a truss side frame for a railway car truck, spaced inboard and outboard truss units formed in substantially parallel vertical webs, each unit comprising a tension member, a compression member, and spaced columns forming with said members a bolster opening, said members merging at the ends of the frame with integrally formed journal boxes extending between said units, a substantially horizontal transverse web joining said units at the top of said frame, and a transverse web joining said units at the bottom of said frame, extending from end to end thereof, having a spring seat beneath said bolster openings, and having horizontal spring seat portions merging with the inner walls of said journal boxes.

8. A side frame for a railway car truck comprising spaced truss units arranged in substantially parallel vertical planes with each unit having a tension member, a compression member, spaced columns integrally formed with said members and defining therewith transversely aligned bolster openings, said members merging adjacent their ends with integrally formed journal boxes extending between said units, and transverse webs joining said units at the top and bottom of said frame, said bottom transverse web comprising a spring seat beneath said bolster openings and merging with said journal boxes in spring seat portions at the extremities of said frame and said top transverse web having its ends spaced from said journal boxes to permit the insertion thereover of an associated semi-elliptic spring.

9. In a quick wheel change railway car truck, spaced side frames of truss type each comprising tension and compression members and spaced columns forming a bolster opening, said members merging adjacent the ends of the frame with integrally formed journal boxes, coil springs seated on each of said tension members beneath said bolster opening, a semi-elliptic spring housed within each frame and seated at spaced points on the associated coil springs and supported at its extremities on the associated frame, spaced equalizer members on said semi-elliptic springs in each of said openings, and a load carrying member extending between said frames with jaw ends engaging said spaced equalizer members.

10. A side frame for a railway car truck comprising spaced truss units formed in substantially parallel vertical planes, each unit having a tension member, a compression member, and spaced columns defining with said members a bolster opening, spaced ties joining the respective columns of said units and forming therewith openings of substantially the same height as said bolster opening, said members merging adjacent their ends with integral journal boxes extending between said units, a transverse substantially horizontal longitudinal web joining said units at the top of said frame, and a transverse longitudinal web joining said units at the bottom of said frame, and spaced spring seats formed on said bottom transverse web at the extremities thereof and adjacent said openings.

11. In a truss side frame, spaced inboard and outboard truss units formed in substantially parallel vertical planes from end to end of said frame, said units comprising tension members, compression members, and spaced columns defining aligned bolster openings at opposite sides of said frame, said members merging at the ends of said frame with integrally formed journal boxes extending therebetween, and longitudinal transverse webs joining said units at the top and bottom of said frame, said bottom longitudinal web having a spring seat beneath said bolster openings and substantially horizontal end portions merging with the lower inner corners of the adjacent journal boxes to form other spring seats.

12. A side frame for a railway car truck comprising spaced truss units formed in substantially parallel vertical planes, each unit having a tension member, a compression member, and spaced columns defining with said members a bolster opening, said members merging adjacent their ends with integral journal boxes extending between said units, a transverse substantially horizontal longitudinal web joining said units at the top of said frame, a transverse longitudinal web joining said units at the bottom of said frame, comprising a spring seat beneath said bolster opening, and merging at its extremities with said boxes, and spaced spring seats formed on said bottom transverse web at said extremities.

13. A side frame for a railway car truck comprising spaced truss units arranged in substantially vertical planes, each unit including top and bottom members and spaced columns defining with said members a bolster opening, journal boxes extending between said units and formed integral therewith, transeverse webs joining said units at the top and bottom of said frame and transverse ties joining the upper and lower ends respectively of the inboard and outboard columns, and horizontal end and central portions on said bottom web forming seats for associated springs of different character.

14. A side frame for a railway car truck comprising spaced truss units arranged in substantially vertical planes, each unit including top and bottom members and spaced columns defining with said members a bolster opening, journal boxes extending between said units and formed integral therewith, transverse webs joining said units at the top and bottom of said frame and transverse ties joining the upper and lower ends respectively of the inboard and outboard columns to form openings aligned longitudinally of said frame, end and central spring seats on said bottom web, coil springs seated on said central seats and a leaf spring extending through said longitudinally aligned openings and supported on said end seats and said coil springs, and a bolster having jaw ends embracing said leaf spring at spaced points in said bolster opening.

15. A side frame for a railway car truck comprising spaced truss units arranged in substantially vertical planes, each unit including top and bottom members and spaced columns defining with said members a bolster opening, journal boxes extending between said units and formed integral therewith, transverse webs joining said units at the top and bottom of said frame and transverse ties joining the upper and lower ends respectively of the inboard and outboard columns to form openings aligned longitudinally of said frame, end and central spring seats on said bottom web, coil springs seated on said central seats and a leaf spring extending through said longitudinally aligned openings and supported on said end seats and said coil springs, equalizer blocks on said leaf spring at spaced points within said bolster opening, and a load carrying member extending within said bolster opening and having jaw portions engaging said blocks.

16. In a truss side frame, spaced inboard and outboard truss units formed in substantially parallel vertical planes from end to end of said frame, said units comprising tension members, compression members, and spaced columns defining aligned bolster openings at opposite sides of said frame, journal boxes extending between said units at the ends of said frame, and transverse webs joining said units at the top and bottom of said frame, said bottom web having substantially horizontal portions merging with the adjacent journal boxes to form spring seats, coil springs in said bolster openings seated on said bottom web, a semi-elliptic spring seated on said springs and said spring seats, and a bolster end in said bolster openings comprising jaw portions engaging said semi-elliptic spring.

17. In a railway car truck, spaced side frames, each comprising truss units arranged in substantially parallel vertical planes with each unit having tension and compression members and spaced columns defining therewith a bolster opening, said members merging adjacent their ends with journal means extending between said units, and transverse webs joining said units at the top and bottom of the frame, said bottom web comprising a spring seat beneath the associated bolster openings and merging with said journal means in spring seat portions at the extremities of said frame, coil springs on said spring seat, a spring of a different character positioned at each end thereof on the associated spring seat portion and seated intermediate said ends on said coil springs, and a bolster extending between said frames and comprising ends received within respective bolster openings and seated on respective of said second-mentioned springs.

18. In a side frame, spaced vertical webs each in the form of a truss comprising tension and compression members merging at their ends, and spaced columns defining with said members a bolster opening, journal boxes joining adjacent ends of said vertical webs, spaced transverse ties joining upper and lower ends of respective columns and defining therewith openings of the same height as said bolster opening, and transverse flanges joining the top and bottom of said vertical webs.

19. In a side frame, spaced truss units formed in substantially parallel vertical planes from end to end of said frame, said units comprising tension members, compression members, and spaced columns defining aligned bolster openings at opposite sides of said frame, journal boxes extending between and integrally formed with adjacent ends of said units, spaced transverse ties extending between the inboard and outboard columns and defining openings aligned longitudinally of said frame, said last-mentioned openings being of substantially the same height as said bolster openings, and transverse webs joining said units at the top and bottom of said frame, said bottom web having spaced seats for springs of different character and having substantially horizontal end portions merging with said journal boxes.

20. In a side frame, spaced vertical webs each in the form of a truss comprising tension and compression members merging at their ends and spaced columns defining with said members a bolster opening, journal boxes joining adjacent ends of said vertical webs, and transverse flanges joining the top and bottom of said vertical webs, said bottom flange having a seat beneath said bolster opening for associated coil springs and substantially horizontal end portions merging with said journal boxes to form spring seats for springs of different character.

21. In a side frame, spaced vertical webs each in the form of a truss comprising tension and compression members merging at their ends and spaced columns defining with said members a bolster opening, journal boxes joining adjacent ends of said vertical webs, spaced transverse ties joining upper and lower ends of respective columns and defining therewith openings of substantially the same height as said bolster opening, and transverse flanges joining the top and bottom of said vertical webs, said bottom flange having substantially horizontal end portions merging with said journal boxes to form spring seats.

ALFRED H. OELKERS.